United States Patent Office 3,305,558
Patented Feb. 21, 1967

3,305,558
5-, 6- AND 7-CYANOBENZIMIDAZOLE
DERIVATIVES
Henri Depoorter, Gerrit Godfried van Mierlo, Marcel Jan Libeer, and Jean Marie Nys, all of Mortsel-Antwerp, Belgium, assignors to Gevaert Photo-Producten N.V., Mortsel-Antwerp, Belgium
No Drawing. Filed Sept. 26, 1960, Ser. No. 58,215
Claims priority, application Great Britain, Sept. 24, 1959, 32,493/59
1 Claim. (Cl. 260—309.2)

This invention relates to 5-, 6- and 7-cyanobenzimidazole derivatives.

The 5-, 6- and 7-cyanobenzimidazole derivatives of the present invention are new compounds which are represented by the general formula:

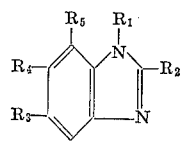

wherein $R_1$ is a member selected from the group consisting of an alkyl group and a substituted alkyl group;

$R_2$ is a reactive group selected from those known in cyanine chemistry;

$R_3$, $R_4$ and $R_5$ each represents a member selected from the group consisting of a hydrogen atom, a chlorine atom and a cyano group, at least one of the substituents $R_3$, $R_4$ and $R_5$ being a cyano group.

The new compounds represented by the above formula are prepared by cyclizing substituted o-phenylene diamines with acetic acid, acetic anhydride, acetyl chloride, acetonitrile, acetamide and so on, according to usual methods known to those skilled in the art.

The benzimidazole derivatives of the present invention are particularly useful in the preparation of optical sensitizing dyes for photographic silver halide emulsion layers. Such sensitizing dyes and methods for applying them in silver halide emulsions are described in British application No. 34,641/59 filed October 13, 1959. This British application forms the basis of U.S. applications Serial No. 62,107 and 62,331 filed October 12, 1960, and October 13, 1960, respectively, and now abandoned.

The following examples illustrate the present invention without limiting, however, the scope thereof.

EXAMPLE 1

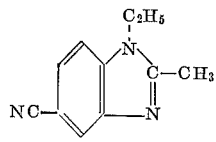

1-ethyl-2-methyl-5-cyano benzimidazole

A solution of 76.5 g. of 3-nitro-4-bromo benzonitrile in 350 cm.³ of ethanol is treated with 90 g. of aqueous ethylamine 50% and refluxed for 4 hours. On cooling 68.5 g. of N-ethyl-2-nitro-4-cyano aniline are obtained. Melting point: 132° C. This product can also be prepared according to Mattaar, Rec. 41, 30 (1922). Within a period of 15 min., 78 g. of zinc powder are gradually added to a stirred mixture heated to 80° C. and consisting of 38.2 g. of N-ethyl-2-nitro-4-cyano aniline, 200 cm.³ of acetic acid and 75 cm.³ of acetic anhydride. After refluxing for 3 hrs. cooling and filtering this solution, the filter cake obtained is washed with 100 cm.³ of acetic acid. The filtrate is then evaporated and the residue left is redissolved in water. After alkalizing this solution with about 150 cm.³ of aqueous sodium hydroxide 30% the precipitate formed is extracted with chloroform. By distilling this chloroform extract, 19 g. of 1-ethyl-2-methyl-5-cyano benzimidazole is obtained. Melting point: 162° C. Boiling point: 200° C. at 0.02 mm. of Hg pressure. This product can also be obtained as follows: 245 g. (0.98 mol) of 2-methyl-5-amino-1-ethylbenzimidazole dihydrochloride are dissolved in 790 cm.³ of water in a 3 l. flask provided with a glass stirrer, a thermometer, an air tube and a dropping funnel. This flask is placed in a cooling bath. Between 0 and 5° C. a solution of 69 g. (1 mol) of sodium nitrite in 245 cm.³ water is dropwise added and a quite dark red solution is obtained. This solution is kept below 5° C. and is rather quickly added whilst strongly stirring to a filtrated solution at 25° C. of 177.8 g. (1.98 mol) of cuprocyanide and 243 g. (4.9 mol) of sodium cyanide in 1780 cm.³ of water. The temperature rises very slightly up to about 30° C. whilst nitrogen is set free. Afterwards the reaction solution is kept for another 30 min. at 60° C. and a brown precipitate is formed. After cooling, sucking off, and drying in vacuum at about 55° C., 207 g. of a raw product are obtained. Whilst stirring this dry raw product is boiled up with 1.5 l. of benzene and filtrated through a heated funnel. The residue obtained is boiled up again with benzene and filtrated. These combined filtrates are heated with Norit (registered trade name) and filtrated. The obtained filtrate is cooled down and the precipitate is sucked off and washed with a small amount of hexane. The filtrate is evaporated in vacuum on a water-bath until a volume of about 700 cm.³, and cooled. The precipitate is sucked off, washed with n-hexane and dried in vacuum at about 55° C. Yield: 135 g. (74%). Melting point: 162° C. Whilst stirring, this raw dry product is boiled with 1.5 l. of benzene and filtrated through a heated funnel. The residue is boiled again with benzene and filtrated whilst warm. Both the filtrates are combined and heated with Norit (registered trade name) and filtrated whilst warm. After cooling, the crystallized 1-ethyl-2-methyl-5-cyano benzimidazole is filtrated on a Büchner filter, and washed with a small amount of hexane. By evaporating the filtrate to about 700 cm.³ a second portion is obtained which is dried under vacuum at about 55° C. Yield: 135 g. (74%). Melting point: 162° C.

EXAMPLE 2

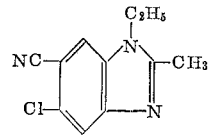

1-ethyl-2-methyl-5-chloro-6-cyano benzimidazole 117 g. of 1-ethyl-2-methyl-5-chloro benzimidazole are nitrated by adding it in small portions to a mixture of 84 cm.³ of nitric acid (d.=1.42) and 240 cm.³ of sulfuric acid. While adding said small portions it has to be observed that, before adding a further portion, the foregoing portion has to be entirely dissolved. After heating for ½ hr. on a boiling water-bath, the reaction mixture is poured out into 1200 cm.³ of ice-water and alkalized with ammonia. After sucking off and washing with water the precipitate is recrystallized from 1800 cm.³ of ethanol. Yield: 100.5 g. Melting point: 173° C. 135.2 g. of this 1-ethyl-2-methyl-5-chloro-6-nitrobenzimidazole are hydrogenated in the presence of Raney nickel in 1.5 l. of ethanol. After evaporation to dryness of the reaction mixture, the residue thus obtained is recrystallized from ethanol whereby 926 g. of 1-ethyl-2-methyl-5-chloro-6-amino benzimidazole are obtained. Melting point: 171° C. After evaporation of the mother liquor to a smaller volume, still 6.4 g. are obtained having the same melting point. 56 g. of this 1-ethyl-2-methyl-5-chloro-6-amino benzimidazole in 85 cm.³ of hydrochloric acid and 193 cm.³ of water are diazotized with 18.9 g. of sodium nitrite in 60 cm.³ of water at 0–5° C. After filtrating, the reaction mixture is poured out into a mixture of 24 g. of cuprocyanide, 28 g. of sodium cyanide, 450 cm.³ of water and 100 cm.³ of benzene, stirred for 15 minutes at room temperature and then stirred for 30 minutes on a boiling water bath. After cooling, this mixture is filtrated and the precipitate obtained is washed with benzene. The benzene is evaporated and the residue obtained is recrystallized from benzene-hexane, and finally distilled under reduced pressure. Yield: 12.1 g. Melting point: 166° C.

EXAMPLE 3

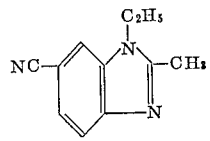

1-ethyl-2-methyl-6-cyano benzimidazole 7.8 g. of 1-ethyl-2-methyl-6-aminobenzimidazole are dissolved in 17 cm.³ of hydrochloric acid, diluted with 40 cm.³ of water and diazotized with 3.85 g. of sodium nitrite in 15 cm.³ of water at 0–5° C. After neutralizing the reaction mixture with sodium carbonate, it is poured out into a solution of 4.25 g. of cuprocyanide and 4.9 g. of sodium cyanide in 75 cm.³ of water, which has been preheated to 60° C. The resulting mixture is kept for 30 min. at this temperature. After cooling, the reaction mixture is sucked off and the residue is washed with water. The solid product is extracted 3 times and the aqueous layer is extracted once with portions of 50 cm.³ of boiling chloroform. After drying the extract thus obtained over potassium carbonate, it is evaporated to dryness and the residue is recrystallized from benzene-hexane. Yield: 2.2 g. Melting point: 117° C.

EXAMPLE 4

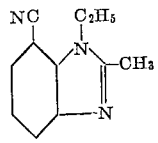

1-ethyl-2-methyl-7-cyano benzimidazole 40.5 g. of 1-chloro-2,6-dinitro benzene are dissolved in 180 cm.³ of ethanol at 50° C. and added at once to a mixture of 100 cm.³ of ethanol, 54 g. of 50% ethylamine and 1.2 g. of cuprichloride dihydrate. The solution is allowed to cool to room temperature whilst stirring and the formed N-ethyl-2,6-dinitro aniline is sucked off. Yield: 34 g. Melting point: 87° C. By a further cooling of the mother liquor, followed by sucking off and recrystallizing from ethanol, still 3 g. of the pure product are obtained. 56 g. of this N-ethyl-2,6-dinitro aniline in 208.5 g. of acetic anhydride are hydrogenated in the presence of Raney nickel. After distilling off the formed acetic acid, 100 cm.³ of acetic anhydride are further added. The mixture is boiled for 1½ hr. and evaporated to dryness. Next, 24 cm.³ of acetic acid and 200 cm.³ of 5 N hydrochloric acid are added. The mixture is boiled for another hour. The reaction mixture is evaporated to dryness onto the residue obtained 200 cm.³ of ethanol are poured. The mixture obtained is sucked off, dissolved in 40 cm.³ of water and diazotized with 3.5 g. of sodium nitrite in 7 cm.³ of water. This mixture is poured out into a mixture of 9 g. of cuprocyanide, 12.25 g. of sodium cyanid, 100 cm.³ of water and 100 cm.³ of benzene, which was preheated to 60° C. The benzene layer is separated and the aqueous layer is once again extracted with benzene. The joint benzene extracts are evaporated to dryness and the residue obtained is recrystallized twice from hexane. Melting point: 47° C.

EXAMPLE 5

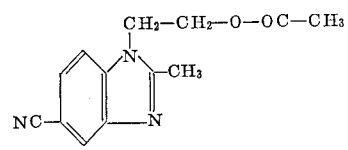

1-(β-acetoxyethyl)-2-methyl-5-cyano benzimidazole 51.5 g. of 3-nitro-4-bromo benzonitrile, 220 cm.³ of ethanol and 42 g. of ethanol amine are refluxed for 8 min. On cooling the reaction mixture N-(β-hydroxyethyl)-4-cyano aniline crystallizes out and is recrystallized from ethanol. Yield: 40.8 g. Melting point: 134° C. 40 g. of this product are hydrogenated in the presence of Raney nickel in 200 cm.³ of ethanol and, after evaporation of the solvent, boiled for 2 hr. with 120 cm.³ of acetic anhydride. The excess of acetic anhydride and the formed acetic acid are distilled off and the residue is recrystallized from ethanol. Yield: 25.9 g. Melting point: 151° C.

We claim:

A compound of the formula:

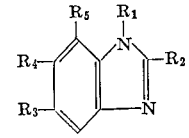

wherein $R_1$ is a lower alkyl group;

$R_2$ is methyl;

$R_3$, $R_4$ and $R_5$ are radicals selected from the group consisting of a hydrogen atom, a chlorine atom and a cyano group, at least one of the substituents $R_3$, $R_4$ and $R_5$ being a cyano group.

References Cited by the Examiner

UNITED STATES PATENTS

| | | | |
|---|---|---|---|
| 2,778,823 | 1/1957 | Brooker et al. | 260—309.2 |
| 2,882,158 | 4/1959 | Brooker et al. | 260—240 |
| 2,918,369 | 12/1959 | Doorenbos | 260—309.2 |

OTHER REFERENCES

Copeland et al.: Jour. Amer. Chem. Soc., vol. 65, pages 1072–75 (1943).

Lange et al.: Handbook of Chemistry, 6th edition, pages 358–59, Sandusky, Ohio, Handbook Pub., 1946.

Kiprianov et al.: Chem. Abstracts, vol. 47, col. 4769 (1953).

Wagner et al.: Synthetic Organic Chemistry, pages 590–591, New York, Wiley, 1953.

WALTER MODANCE, *Primary Examiner.*

NATALIE TROUSOF, DUVAL T. McCUTCHEN,
*Assistant Examiners.*